March 27, 1962 H. T. STENHAMMAR ETAL 3,027,506
TIMED MOTOR CONTROL PROGRAMMER FOR TUNERS
Filed March 11, 1959 5 Sheets-Sheet 3
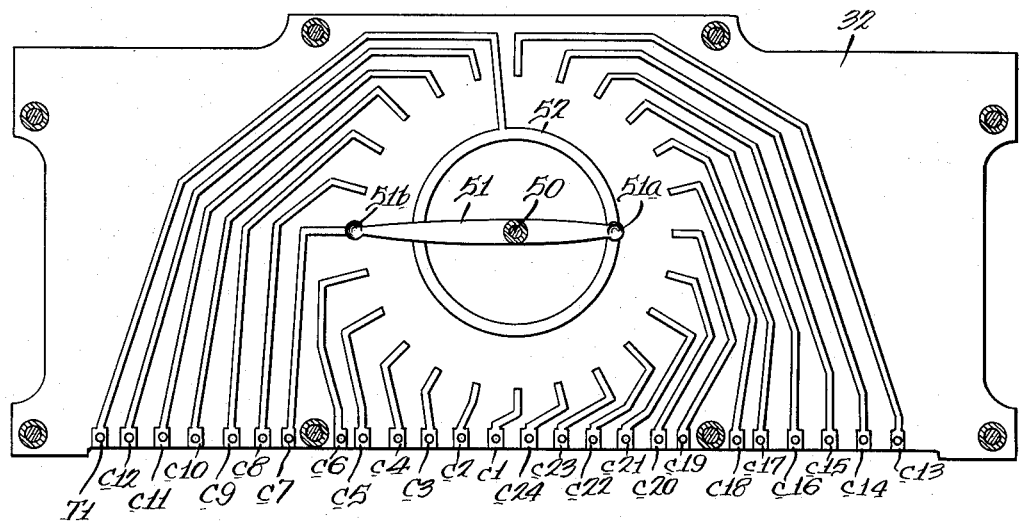
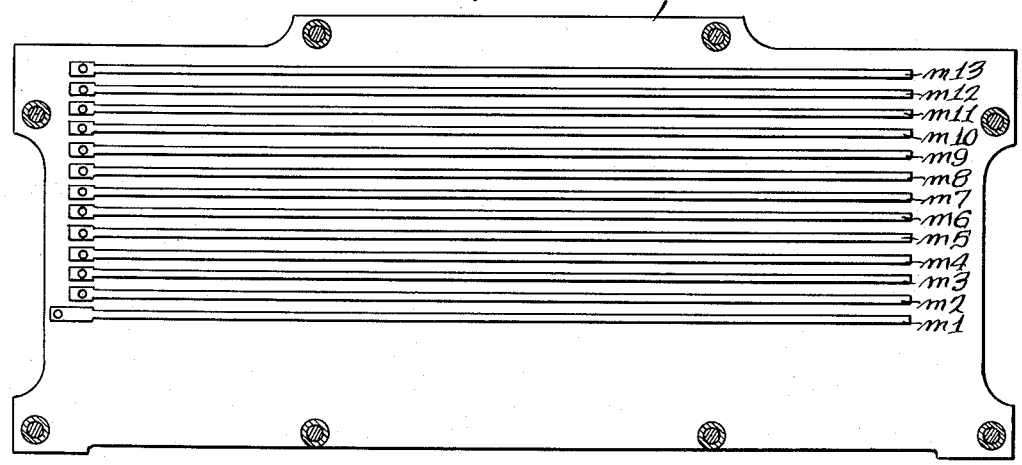
INVENTORS.
Harold T. Stenhammar
Leo Kull
By
Atty

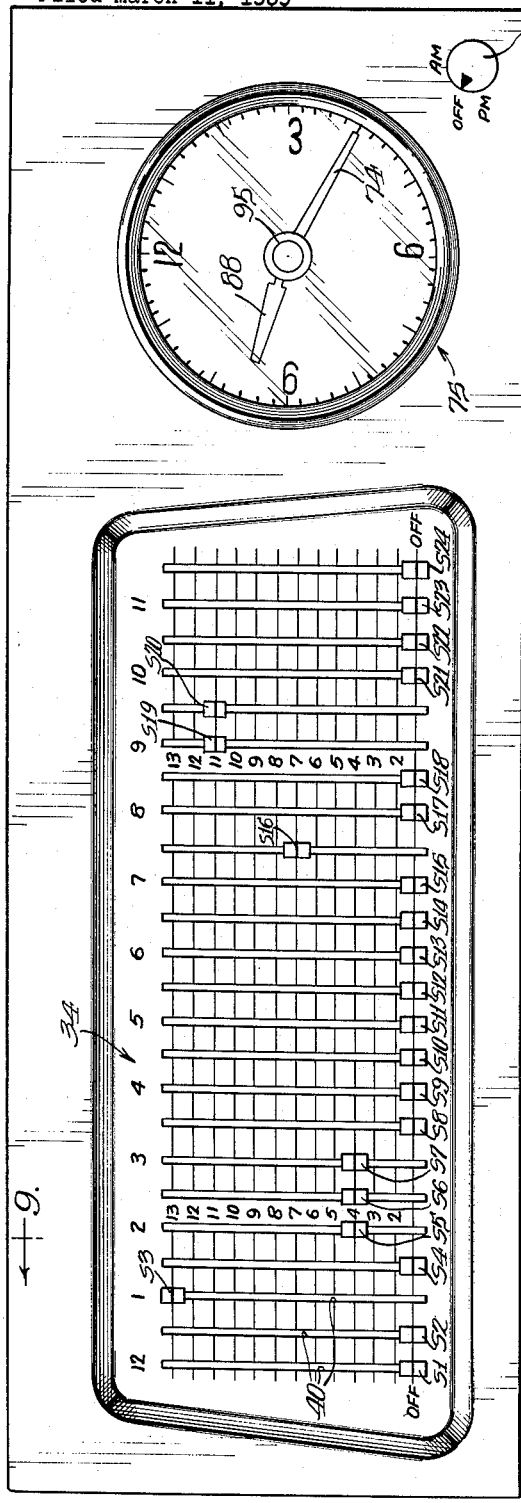
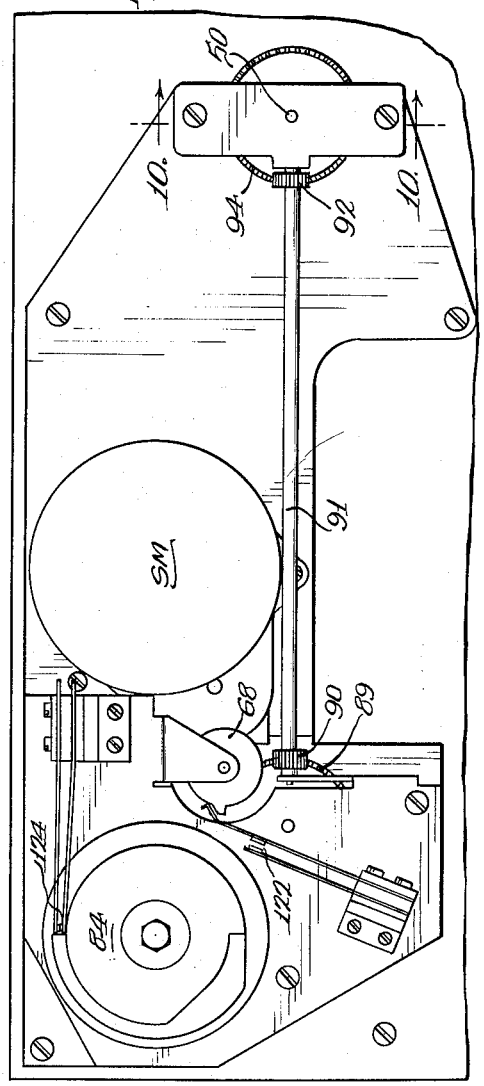
INVENTORS.
Harold T. Stenhammar
Leo Kull
By

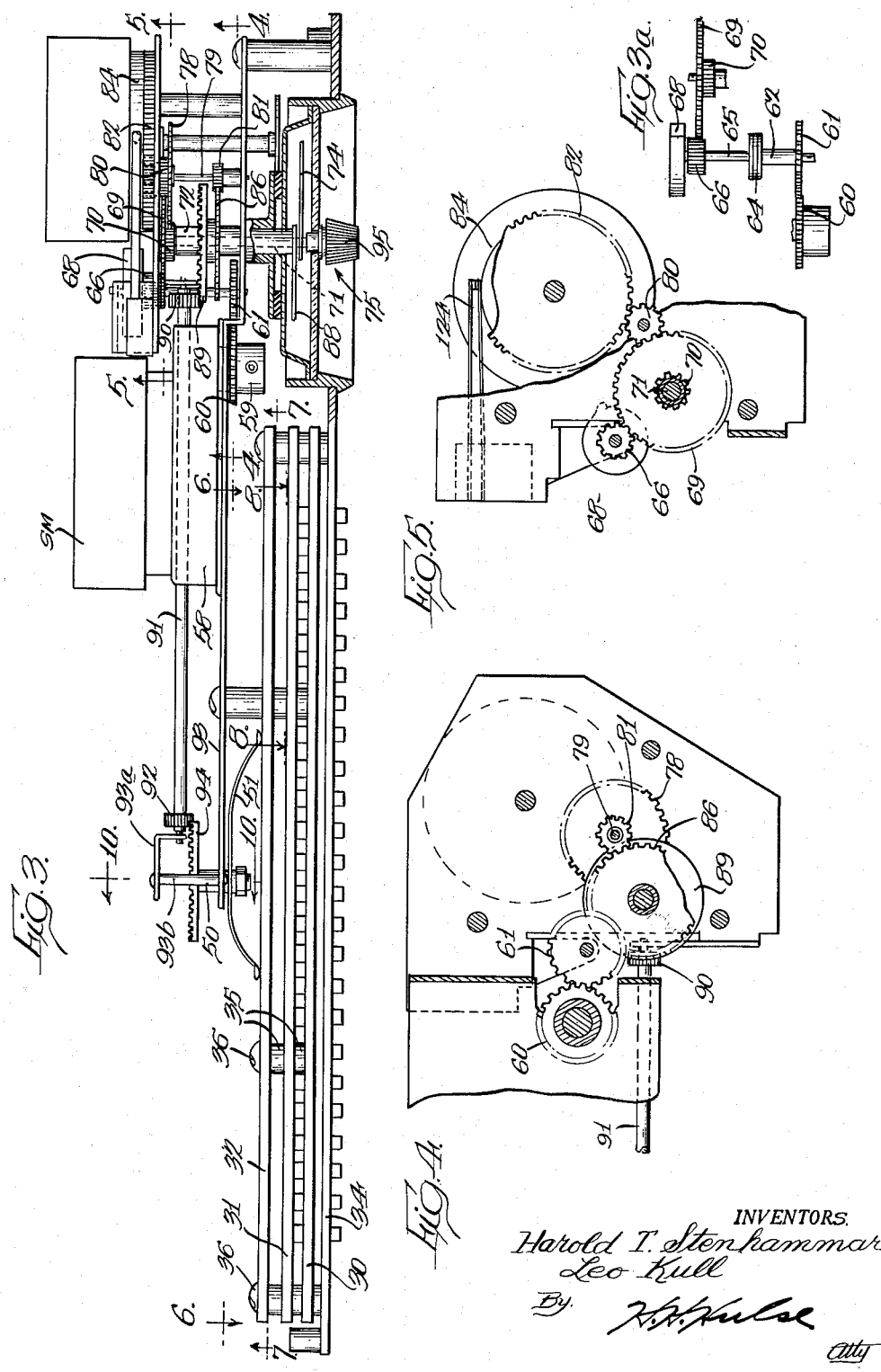

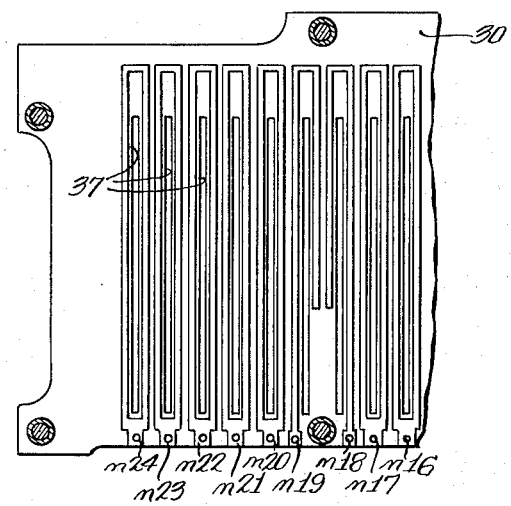
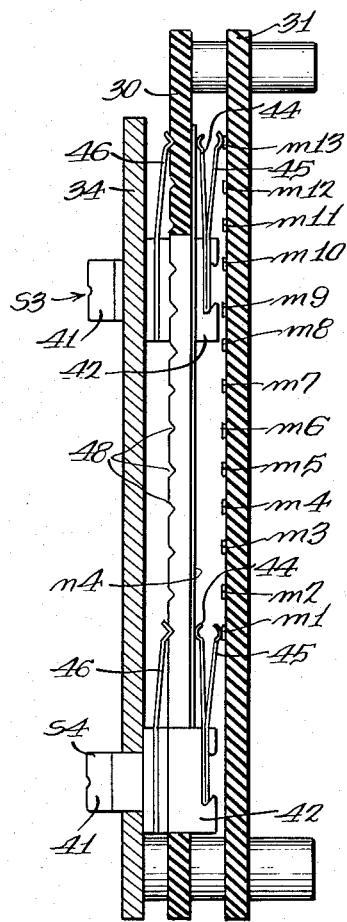
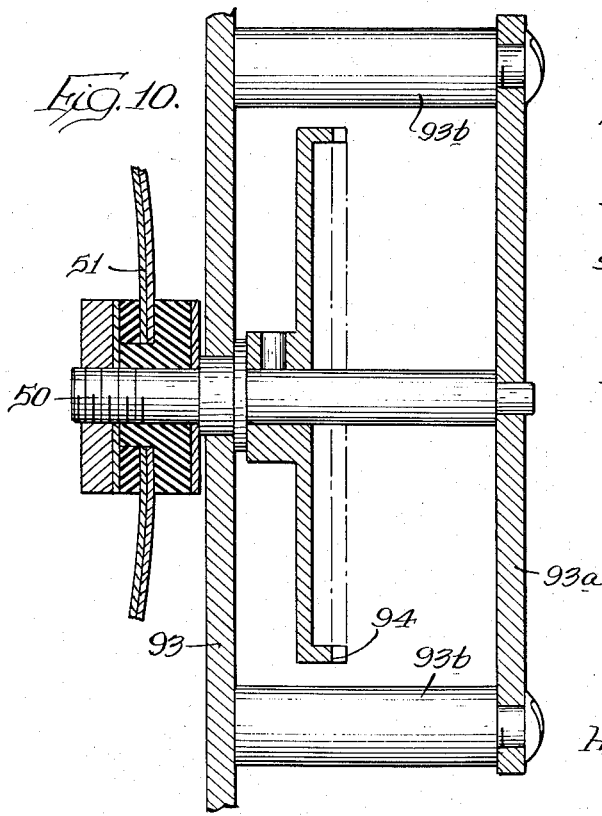

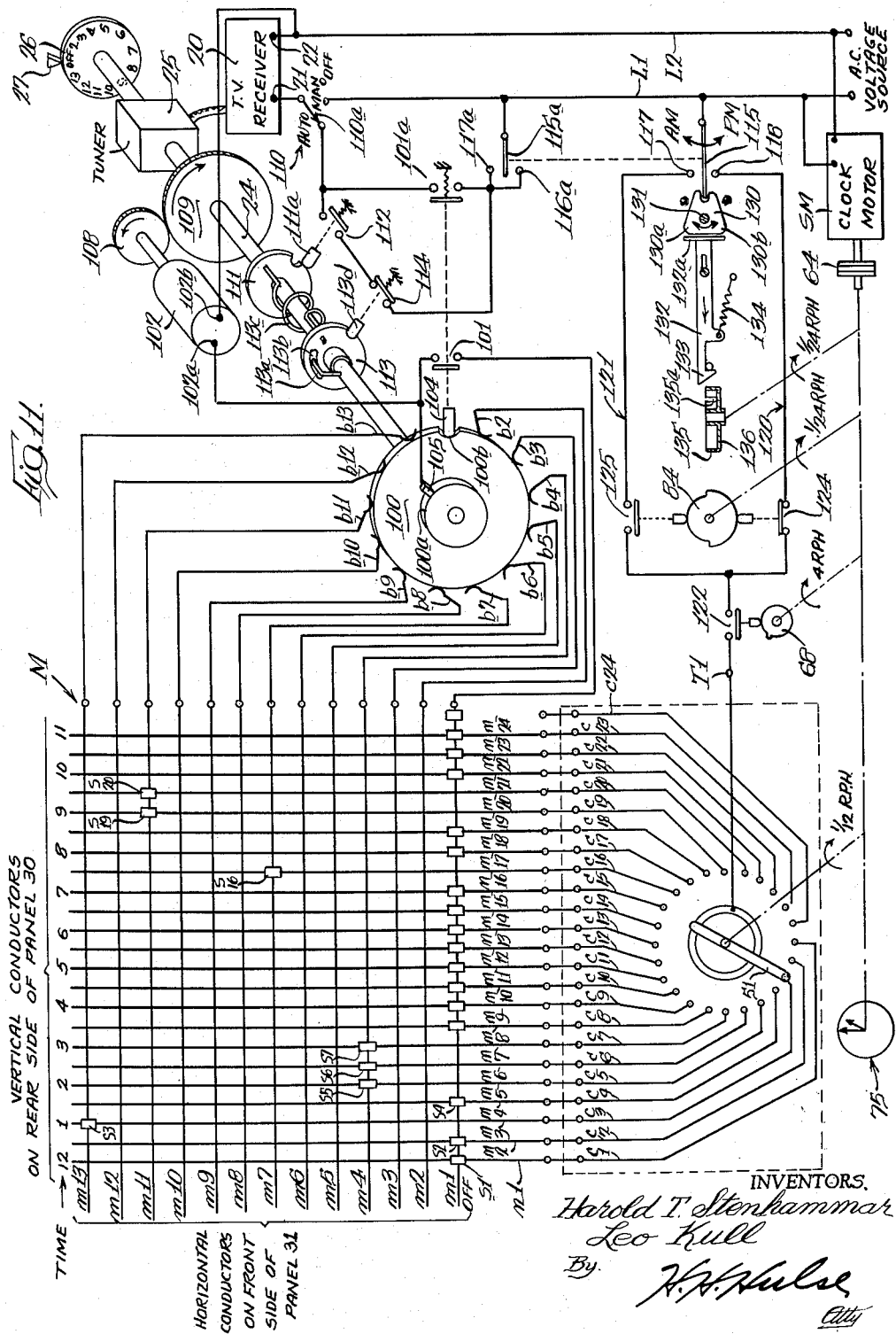

ND Patent Office
3,027,506
Patented Mar. 27, 1962

3,027,506
TIMED MOTOR CONTROL PROGRAMMER
FOR TUNERS
Harold T. Stenhammar, New York, N.Y., and Leo Kull,
Jersey City, N.J., assignors to General Time Corporation, New York, N.Y., a corporation of Delaware
Filed Mar. 11, 1959, Ser. No. 798,740
14 Claims. (Cl. 318—486)

This present invention has to do with controlling the operation of television receivers or other similar devices during succeeding time intervals according to preselectable programs.

It is the general aim of the invention to provide an improved programmer which is relatively simple in construction, reliable in operation, and which is characterized by a high degree of convenience with which various programs can be preselected or modified.

An important object of the invention is to bring forth a programmer in which all parts driven at a timed rate may move continuously, and in which there is no necessity to reset a movable element or carefully adjust its position to agree with real time whenever a programmed period is initiated.

Another object of the invention is to provide a new and advantageous matrix and switching arrangement for energizing any one of a plurality of output conductors during different succeeding time intervals, such arrangement being characterized by a sandwich-like assembly of component parts which are relatively compact and inexpensive to manufacture.

It is a further object of the invention to provide a programmer which controls the operation of a television receiver or the like over successive intervals of a predetermined period, and in which the programmed operation will be effected during selected ones of alternate periods. In this connection, the invention makes it possible to select a desired program over a twelve hour interval, and then to determine whether the program will be followed during the a.m. or p.m. hours of the day. It is thus possible to achieve automatic programmed operation of a television receiver or the like over all twenty-four hours of a day even though the programmer is compactly and economically constructed to operate over a basic twelve hour program period.

Still another object is to provide a programmer in which no daily reset of an element driven at a timed rate is required, yet in which the program for one day will not be repeated the next day unless the user affirmatively conditions the apparatus to repeat the preceding program.

Other objects and advantages will become apparent as the following description proceeds, taken in conjunction with the accompanying drawings, in which:

FIGURE 1 is a front elevation of an exemplary programmer embodying the features of the invention;

FIG. 2 is a rear elevation (with cover removed) of the programmer;

FIG. 3 is a plan view (with cover removed) of the programmer, with a portion thereof being taken in section for added clarity;

FIG. 3a is a detail view of a part of timing gearing;

FIGS. 4 and 5 are detail views, taken in section substantially along the line 4—4 and 5—5 respectively in FIG. 3;

FIGS. 6 and 7 are rear and front elevational views, taken substantially along the lines 6—6 and 7—7, respectively, in FIG. 3, of a conductor panel;

FIG. 8 is a fragmentary rear elevation, taken substantially along the line 8—8 in FIG. 3, of a second conductor panel;

FIG. 9 is a vertical section taken substantially along the line 9—9 in FIG. 1;

FIG. 10 is a fragmentary sectional view taken substantially along the line 10—10 in FIG. 2; and FIG. 11 is a partially diagrammatic, partially schematic illustration of the programmer and its electrical circuits, shown in association with a television receiver.

While the invention has been shown and will be described in some detail with reference to a particular embodiment thereof, there is no intention that it be limited to such detail. On the contrary, it is intended here to cover all modifications, alternatives, and equivalents falling within the spirit and scope of the invention as defined by the appended claims.

It will be helpful first briefly to consider the television receiver illustrated diagrammatically in FIG. 11 as an exemplary device to be controlled according to preselected programs. The television receiver 20 is illustrated in block-and-line form and shown as having power input terminals 21, 22 to which an energizing voltage is supplied when the receiver is turned on. A control member or shaft 24 is movable to a plurality of different positions to effect different modes of operation. That is, the shaft 24 is associated with a conventional television tuner 25 connected to the receiver 20, and is positionable to a plurality of angular positions to condition the tuner 25 and receiver 20 for reception of television signals over different frequency channels. In the present instance the shaft 24 is movable to a total of thirteen different angular positions, the first being a position assumed when the television receiver 20 is to be turned off, and the remaining twelve positions conditioning the tuner 25 to receive signals in the well known television channels 2–13, respectively. When the television receiver 20 is to be operated conventionally under manual control, the shaft 24 may be set to any of its several angular positions by means of a knob 26 having numerical indicia indicating a selected channel opposite an index mark 27.

In keeping with an important feature of the present invention, the automatic programmer for controlling the television receiver 20 and its tuner 25 includes an electrical selector matrix M having a first plurality of $n$ input conductors and a second plurality of $m$ output conductors, together with means for selectively establishing electrical connection between each input conductor and any one of the output conductors. This matrix is conveniently and compactly constructed in a manner which lends itself to quick and convenient setting of any desired program by the user.

In constructing this selector matrix, first and second panels 30 and 31 of insulating material are mounted in spaced, parallel planes, being sandwiched in between a third panel 32 at the rear and an escutcheon plate 34 at the front, the entire assembly of panels and escutcheon plate being held together by spacers 35 on bolts or studs 36 (FIG. 3). The panels 30 and 31 are preferably made of insulating material such as plastic or pressed fiberboard, and respectively carry the plurality of $n$ input conductors and $m$ output conductors in spaced parallel planes and disposed at angles relative to one another so as to form an unconnected matrix.

As shown in greater detail by FIG. 8, the panel 30 has fixed or bonded on its rear surface a plurality of vertically disposed, parallel conductors which may take the form of metallic ribbons applied by the printed circuit technique. For convenience of electrical engagement with these conductors, each is formed as a closed loop parallel to and surrounding a corresponding one of a plurality of vertical slots 37, the purpose of which will become apparent below. While FIG. 8 in its fragmentary form reveals only eight of the input conductors $n17$ through $n24$, it will be understood that in the preferred form of the invention there are a total of twenty-four such vertical conductors spaced apart laterally on the rear surface of the panel 30.

The front surface of the panel 31, on the other hand, carries the plurality of m output conductors. As shown in FIG. 7, there are a total of thirteen such output conductors designated m1 through m13, extending horizontally across the panel 31 parallel to one another but spaced apart vertically. With the panels 30 and 31 mounted in parallel relation as shown by FIG. 3, the vertically disposed input conductors thus form a rectangular grid-like matrix with the horizontally disposed output conductors (see also FIG. 11).

In order to selectively establish electrical connection between each of the input conductors and any one of the output conductors, a plurality of selector members are employed, each being movable to adjusted positions along a corresponding one of the input conductors and having means to effect electrical connection between that corresponding input conductor and any one of the output conductors depending upon the adjusted position thereof.

As here shown in FIG. 1, a plurality of selector members s1 through s24 project through and are slidable vertically along a plurality of vertical, parallel slots 40 cut in the escutcheon plate 34. The selector members s3 and s4, identical to the others, are more clearly illustrated in FIG. 9. Each includes a rigid finger piece 41 which projects through the corresponding slot 40 in the escutcheon plate 34, and a body 42 which is disposed for movement within one of the slots 37 in the first conductor panel 30. By virtue of this arrangement, each of the selector members s1 through s24 is movable vertically along a path adjacent to and parallel to a corresponding one of the input conductors n1 through n24. Each of the selector members includes a pair of spring arms 44, 45 (FIG. 9) which are carried by the body portions 42 and electrically united. The first such spring arm 44 is urged continuously into electrical contact with the corresponding input conductor on the rear surface of the first panel 30. The second such spring arm 45 is urged into engagement with the front surface of the conductor panel 31 and will, therefore, electrically contact one of the thirteen output conductors m1 through m13 depending upon the vertical position to which that selector member has been adjusted.

In order to hold each selector member in any of its thirteen possible vertical positions at which its spring arm 45 engages one of the thirteen output conductors, each selector member carries a spring detent 46 which is biased into engagement with any of a plurality of horizontal notches 48 cut into and vertically spaced on the front surface of the panel 30. The detent 46 thus yieldably holds its selector member at a desired position of vertical adjustment, yet permits that position to be changed easily by the user through fingertip pressure applied to the fingerpiece 41 to urge the selector member upwardly or downwardly to a new position.

The thirteen possible vertical positions of each of these selector members s1 through s24 are indicated on the front face of the escutcheon plate 34 by horizontally ruled lines associated with numerical indicia. As shown in FIG. 1, the lowermost position for each of the selector members is labeled "Off," while the succeeding twelve vertical positions are labeled with numerals 2 through 13 to designate that the television receiver is to be set to receive signals over channels 2 through 13, respectively.

Further in carrying out the invention, timing means are provided to electrically connect to successive ones of the twenty-four input conductors n1 through n24 during succeeding intervals within a repetitive time period. For this purpose, a commutating device is provided on the rear surface of the panel 32 and includes a plurality of conductive ribbons or contact strips c1 through c24 which are "printed" on that surface (see FIG. 6). These contact strips terminate in twenty-four tips or ends circularly spaced about the axis of a shaft 50. The shaft 50 is driven at a timed rate, preferably one revolution each twelve hours, by means which will be described in detail below. That shaft carries a resilient, conductive wiper arm 51 having one end 51a in continuous engagement with a conductive ring 52 (FIG. 6) connected to a conductor terminal T1 (FIG. 11). The opposite end 51b of the wiper arm 51 lies at a greater radius relative to the axis of the shaft 50 and is adapted to engage successively and electrically connect to the contact strips c1 through c24 as the wiper arm executes each revolution.

The several contact strips c1 through c24 are electrically connected by wiring (not shown except schematically in FIG. 11) to respective ones of the twenty-four input conductors n1 through n24. Thus, it will be apparent that as the wiper arm 51 executes one revolution at a timed rate, the terminal T1 (FIG. 11) will be successively coupled electrically through the wiper arm to successive ones of the input conductors n1 through n24.

For continuously driving the commutator wiper 51 at a timed rate, means associated with an electric clock are employed. As shown in FIGS. 1, 3 and 11 a synchronous motor SM, adapted to be energized from a conventional 60 cycle A.C. voltage source, is mounted just to the right of the several conductor panels 30—32. This synchronous motor may be of conventional construction well known to those skilled in the art and may include a speed-reducing gearbox 58 having an output shaft 59 mounting a pinion 60. By way of example, the synchronous motor and its associated gearbox 58 may be organized such that the pinion 60 rotates at a rate of four revolutions per hour.

Meshed with and driven from the pinion 60 is a gear 61 fast on a shaft 62 which is coupled through a slippable friction device 64 (FIG. 3a) to a shaft 65 mounting a gear 66 and a cam 68. The friction coupling 64 can normally transmit sufficient torque such that the shafts 62 and 65 do not slip relative to one another, and assuming the gear 61 to be the same diameter as the gear 60, then the gear 66 and cam 68 will be driven at a timed rate of four revolutions per hour. The purpose of the cam 68 will become apparent below.

Drivingly meshed with the gear 66 is a larger gear 69 integral with a pinion 70 mounted fast on a shaft 71. The drive ratio between the gear 66 and the gear 69 is such that the pinion 70 and the shaft 71 are driven at a timed rate of one revolution per hour. The shaft 71 projects forwardly through a relatively rotatable sleeve 72 to mount an hour hand 74 of a clock indicator 75.

Meshed with and driven from the small pinion 70 is a larger gear 78 rigid with a shaft 79 carrying front and rear gears 81 and 80. The rear gear 80, in turn, drives a larger gear 82 which is rigid with a cam 84. The relative diameters of these speed-reducing gears are so chosen such that the cam 84 rotates at a rate of one revolution per day, i.e., one revolution per twenty-four hours. The front gear 81, on the other hand, drives a mating gear 86 rigid on the sleeve 72, the relative diameters of these gears being such that the sleeve 72 rotates at a rate of one revolution each twelve hours. The sleeve 72 carries an hour hand 88 for the clock 75. Also, rigidly carried by the sleeve 72 and driven at a rate of one revolution per twelve hours is a toothed wheel 89 meshing with a pinion 90 carried at the right end of a transfer shaft 91. The left end of the transfer shaft mounts another pinion 92 meshed with a toothed wheel 94 (FIGS. 3 and 10) and rigidly mounted on the shaft 50 which supports the commutator wiper 51. The shaft 50 is journaled in a bearing plate 93 extending behind the conductor panels 32, and in a bracket 93a supported from the bearing plate by spacers 93b. In this manner, the wiper 51 is continuously driven at a rate of one revolution each twelve hour period.

The present programmer is one, therefore, which not only includes means to drive a rotatable commutator wiper 51 at a timed rate, but one which may also conveniently include a clock 75 which always displays the correct time. If it should happen that the reading of the clock 75 is incorrect, then a front knob 95 fixed to the shaft 71 may be turned to adjust the angular setting of the minute hand 74. This will not disturb the synchronous motor SM even though the latter is continuously energized since the friction coupling 64 (FIG. 3a) will permit relative slippage between the two shafts 62, 65 when the knob 95 is turned. Nevertheless, angular rotation of the clock-setting knob 95 will produce a corresponding rotation of all of the gears described above with the exception of the gears 60 and 61. Therefore, the angular positions of the cams 68 and 84, as well as the angular position of the commutator wiper 51 will always be in agreement with time as represented by the hands 74 and 88 of the clock 75. This assures that whenever it is necessary to reset the clock 75 the electrical portions of the present programmer will operate on the basis of the corrected time, and without there being any necessity to carefully adjust or reset those portions of the programmer which are driven at timed rate from the synchronous motor.

With the foregoing in mind, the general operation of the present programmer can be understood with reference to FIG. 11. Assume first that the user of the television receiver desires that the television receiver be turned on and set to channel 13 at one o'clock, that it be turned off at one-thirty, that it be turned on and set to channel 4 between two o'clock and three-thirty, that it be turned on and set to channel 7 between seven-thirty and eight o'clock, and that it be turned on and set to channel 11 from nine-o'clock until ten o'clock. To do this, the operator selects with reference to the time scale on the front face of the escutcheon plate 34 (FIG. 1) those particular selector members which will govern the half hour periods for which the television receiver is to be turned on. For example, with reference to the time scale at the top of the escutcheon plate 34 it will be apparent that the selector member $s3$ controls the operation of the television receiver from one o'clock until one-thirty, that the selector member $s4$ controls the operation from one-thirty until two o'clock, etc. To establish the desired program of operation described above, the user simply shifts the selector member $s3$ to the uppermost position corresponding to channel 13, shifts the selector members $s5-s7$ to that level corresponding to channel 4, shifts the selector member $s16$ to that level corresponding to channel 7, and shifts the selector members $s19, s20$ to that level corresponding to channel 11. These are the positions illustrated in FIGS. 1 and 11. The remaining selector members are left in the lowermost position in which they establish electrical connection between their corresponding input conductors and the first output conductor $m1$.

With the several selector members set to the positions illustrated in FIG. 1, then selective electrical connections will be created from the individual input conductors $n1$ through $n24$ to the thirteen output conductors $m1$ through $m13$ as illustrated by way of example in FIG. 11. That is, the input conductor $n3$ is connected to output conductor $m13$; the input conductors $n5-n7$ are connected to the output conductor $m4$; the input conductor $n16$ is connected to the output conductor $m7$; the input conductors $n19$ and $n20$ are connected to the output conductor $m11$; and all remaining input conductors are connected to the output conductor $m1$.

Assume for the moment that the terminal T1 is energized by direct connection to the line L1 of two voltage supply lines L1, L2 connected to an appropriate voltage source. Different ones of input conductors $n1-n24$ will be connected to and placed at the potential of the line L1 during succeeding half-hour intervals over a twelve hour period as the commutator wiper arm 51 rotates through one revolution. The commutator is so phased relative to the hands of the clock 75 that it will engage the contact $c1$ just prior to the time that the clock reads twelve o'clock.

In like manner, the contact 51 will engage the contact members $c2$, $c3$ and $c4$ just prior to the time that the clock 75 reads twelve-thirty, one o'clock, and one-thirty, respectively. The same is true of all of the other contacts $c5$ through $c24$, i.e., each will be connected by the wiper 51 to the terminal T1 prior to the half-hour instant designated by the time scale associated with the connected input conductors $n5$ through $n24$.

With this in mind, it will be apparent that the selector matrix formed by the input conductors $n1-n24$ and output conductors $m1-m13$, conditioned with the selector members $s1-s24$ in the indicated positions, will at the end of most half-hour intervals result in electrical connection between the terminal T1 and the output line $m1$. However, just prior to one o'clock, the terminal T1 will be connected through wiper 51, contact $c3$, conductor $n3$, and selector $s3$ to the output conductor $m13$. Similarly, just prior to two o'clock, two-thirty, and three o'clock, the commutator wiper 51 will create a circuit through contact members $c5$, $c6$ and $c7$ which are electrically united with input conductors $n5$, $n6$ and $n7$, so that the terminal T1 will be electrically connected to the output conductor $m4$. Also, just prior to the instant that the clock 75 reads seven-thirty, the terminal T1 will be connected through the wiper 51 and the input conductor $n16$ to the output conductor $m7$. Finally, just prior to nine o'clock and nine-thirty, the terminal T1 will be connected through the wiper 51 and the input conductors $n19$, $n20$ to the output conductor $m11$.

It will be apparent, therefore, that the selector matrix, preconditioned by selective setting of the members $s1-s24$, and cooperating with the commutator wiper 51 driven at a timed rate, operates to selectively connect the input terminal T1 with different ones of the output conductors $m1-m13$ according to a preselected program.

Electrical means are provided to rotatably position the tuner shaft 24 to that particular one of its thirteen possible angular positions which corresponds to any particular one of the output conductors $m1-m13$ which may be placed at the potential of the voltage supply line L1 through the commutator wiper 51 and selector matrix. For this purpose, each of the output conductors $m2-m13$ is connected to a corresponding one of twelve resilient, conductive brushes $b2-b13$ slidably and electrically engaged with the periphery of a conductive disk 100 rigidly mounted on and insulated from the tuner shaft 24. The output conductor $m1$ is connected through a set of normally open contacts 101 to one terminal 102a of a motor 102. The other motor terminal 102b is permanently connected to the supply line L2. The contacts 101 are controlled by a cam follower 104 which rides upon the periphery of the disk 100. The disk 100 also includes a smaller conductive slip ring 100a continuously and electrically engaged by a sliding brush 105 which leads to the terminal 102a of the motor 102.

Thus, whenever one of the output lines, say the line $m13$, is electrically connected through the selector matrix and wiper arm 51 to the voltage supply line L1, a circuit will be established through the brush $b13$ and the conductive disk 100, as well as the brush 105 and motor 102 to the line L2. With this, the motor 102 is energized and drives the shaft 24 in a clockwise direction through mating gears 108, 109. Whenever the shaft 24 reaches that position which conditions the tuner 25 for reception over channel 13, a notch 100b in the disk 100 will fall opposite the brush $b13$ and thereby interrupt the electrical connection between the brush $b13$ and the disk 100. Accordingly, the motor 102 will be deenergized and the shaft 24 halted in the desired position with the tuner 25 conditioned to receive signals over channel 13.

It will be seen that, in like manner, when any other of the output conductors $m2-m13$ are connected to the line L1 through the commutator wiper 51 and the selector matrix, then the motor 102 will be energized to rotate the shaft 24 until the notch 100*b* falls under the corresponding brush and thereupon deenergizes the motor 102.

When the output conductor *m*1 is placed at the potential of voltage supply line L1, a circuit will be completed through the switch contacts 101 to energize the motor 102. Accordingly, the shaft 24 will be rotated until the notch 100*b* in the disk 100 falls opposite the follower pin or finger 104, and thereby causes opening of the contacts 101. This will deenergize the motor 102 with the tuner shaft 24 in its first position.

To control the energization of the television receiver 20, a manual selector switch 110 with a three-position contact arm 110*a* is interposed between the line L1 and the terminal 21. The receiver will be permanently turned off with the arm 110*a* set to the "off" position. The receiver will be turned on and controlled by manual positioning of the tuner shaft when the arm 110*a* is in the "manual" position. And with the arm 110*a* set to the "auto" position as illustrated, the line L1 will be connected through a switch 115*a*, 116*a*, 117*a* and through contacts 101*a* to the input terminal 21 of the television receiver 20. The purpose of the switch 115*a*, 116*a*, 117*a* will be explained below, and it may be assumed for the moment that one of its pair of contacts is closed. The line L2 is directly connected to the input terminal 22. Thus, whenever the contacts 101*a* are closed, the television receiver will be energized, i.e., turned on. The contacts 101*a* are operated in unison with the contacts 101 and are closed except when the tuner shaft 24 and the disk 100 are in a first position corresponding to the output conductor *m*1 which brings the notch 100*b* opposite the follower 104. Thus, whenever the tuner shaft 24 is set to any of its angular positions corresponding to a selected channel, the television receiver 20 will automatically be turned on. However, when the tuner shaft is set to the "off" position by energization of the motor 102 over the line *m*1 and through the contacts 101, then the contacts 101*a* will be open and television receiver 20 automatically turned off.

It may frequently happen that a program will call for the tuner 25 to be switched from one channel to another at the end of a half-hour interval, wtih the television receiver to remain energized. If the change required is from channel 11 to channel 3, for example, the notch 100*b* will be moved past the follower pin 104. Thus, the contacts 101*a* would ordinarily be momentarily opened and result in a very short interruption of power supplied to the receiver 20. This may cause the receiver to momentarily lose picture synchronism or other unpleasant transient disturbances.

To overcome this difficulty, switch means are connected in parallel with the contacts 101*a* and constructed so as to keep the receiver energized so long as the shaft 24 is rotating and even if the contacts 101*a* are momentarily opened while such rotation is taking place. As here shown, a first cam 111 is rigidly fixed on the shaft 24 and engaged by a follower pin 111*a* controlling contacts 112. The cam 111 is so shaped and phased on the shaft 24 that the contacts 112 will be closed only when the shaft 24 is centered in its "off" position, i.e., when the pin 104 engages the notch 100*b* in the disk 100.

A second cam 113 is rotatably journaled on the shaft 24, but limited as to the extent of its relative rotation by a pin 113*a* rigid with the shaft and projecting through an arcuate slot 113*b* in the cam. A torsion spring 113*c* is connected between the cam 111 and the cam 113 so that it will be substantially relaxed when the shaft 24 is stationary and the left end of the slot 113*b* is engaged with the pin 113*a*. As the shaft 24 starts to rotate clockwise, the cam 113 tends to remain stationary, so that the pin 113*a* moves toward the right end of the slot 113*b*. This "winds up" the spring 113*c* until the pin 113*a* engages the right end of the slot, and thereafter the pin drives the cam 113 in unison with the shaft 24. The cam 113 is engaged by a follower pin 113*d* which controls contacts 114, the latter being in series with the contacts 112, and the series combination in parallel with the contacts 101*a*. The cam 113 is so shaped and the pin 113*a* so located that as the shaft 24 is rotating clockwise, and the spring 113*c* is torsionally stressed, the notches in the two cams 111, 113 are alined. As the shaft 24 is moved through its "off" position, both follower pins 11*a* and 113*d* drop into the notches of their cams, and both contacts 112 and 114 will be closed during the short interval that the contacts 101*a* open, so that the receiver 20 remains energized.

When, however, the motor 102 is deenergized by the contacts 101 with the shaft 24 in the "off" position, the contacts 101*a* will be opened. The contacts 112 are closed by the cam 111, and at the instant that the shaft 24 stops the contacts 114 will be closed by the cam 113. But when the motor 102 is deenergized and the shaft 24 stops, the torsionally stressed spring 113*c* causes the cam 113 to be rotated a few degrees more in a clockwise direction. This advances the notch in the cam 113 beyond the follower 113*d*, thereby causing the contacts 114 to be opened. With both the contacts 101*a* and 114 open, the television receiver 20 is deenergized.

In this manner, the television receiver is automatically turned on or off when the shaft 24 is set to any channel position or the "off" position, but the receiver is held energized if the shaft 24 only momentarily passes through the "off" position.

With the foregoing in mind, it will now be understood how the desired program of control for the television receiver 20 is effected by virtue of the fact that the several selector members *s*1–*s*24 have been set to the positions illustrated by way of example in FIGS. 1 and 11. Assuming still that the terminal T1 is directly connected to the line L1, the tuner shaft 24 will remain in its "off" position with the contacts 101 open as the commutator wiper 51 connects with input conductors *n*1 through *n*4. Then, just prior to one o'clock, the wiper will engage contact member *c*3 and thereby connect input line *n*3 and output line *m*13 to the supply line L1. An energization circuit for the motor 102 will be established from the line *m*13 through the brush *b*13, the conductive disk 100, and the brush 105. This will energize the motor to rotate the tuner shaft 24 until the notch 100*b* falls opposite the brush *b*13 and breaks the motor-energization circuit. The contacts 101*a* will be closed so that the television receiver 20 will be turned on and set to channel 13 between one o'clock and one-thirty. Shortly before one-thirty when the commutator wiper 51 engages contact member *c*4 and input lines *n*4, the output conductor *m*1 will be connected through selector member *s*4 to the supply line L1. The motor 102 will be energized through now-closed contacts 101 until the shaft 24 is rotated to the "off" position, i.e., until the follower 104 drops in the notch 100*b*, thereby opening contacts 101 and 101*a* to deenergize both the motor 102 and the television receiver 20.

With the foregoing explanation of how the television receiver is turned on and set to channel 13 at one o'clock by virtue of the adjusted position of selector member *s*3, and then turned off at one-thirty by virtue of the position of the member *s*4, it will be apparent how the entire program given above by way of example, will be carried out. The television receiver 20 will be turned on and set to channel 4 between two o'clock and three-thirty because of the positions of members *s*5–*s*7. It will be turned off at three-thirty o'clock, and then turned on again and set to channel 7 between seven and seven-thirty o'clock because of the position of member *s*16. And the television receiver will be turned on and set to channel 11 between nine and ten o'clock by virtue of the positions of members *s*19 and *s*20.

It is a relatively simple matter for the user of the television receiver to modify or set up a new program of operation. All that is necessary is that each of the selector members which, according to the time scale at the upper portion of the escutcheon plate, governs the operation of the television receiver during one half-hour interval be set to that vertical position which corresponds to the mode of operation which is desired. If the television receiver is to be turned off during a given half-hour period, then the corresponding selector member will be placed at the lowermost position so that electrical connection is established between its corresponding input conductor and the output conductor $m1$. If operation of the television receiver to receive any given channel during a certain half-hour period is desired, then the corresponding selector member need only be moved vertically to the position indicated by the numerical indicia on the escutcheon plate to correspond to that channel setting. When the given half-hour interval arrives, the television receiver will not only be automatically turned on, but the tuner shaft will be automatically set to the proper angular position to condition the tuner for reception of signals over the desired frequency channel.

In the illustrated embodiment of the invention, the selector matrix is provided with only twenty-four input conductors, each corresponding to a half-hour interval. Thus, the present programmer is intended to govern operation of a television receiver over a twelve-hour period. This will normally suffice for most users, since the principal television viewing hours are between twelve noon and twelve midnight. It may be desirable, however, in some instances to effect automatic programmed operation of the television receiver in the morning hours, i.e., in the twelve-hour a.m. period between midnight and twelve noon.

In accordance with another feature of the present invention, provision is made to extend the operating period of the present television programmer, and to permit it to effect automatic control of the television receiver either during the a.m. hours or the p.m. hours, and even though the selector matrix is economically constructed to cover only a twelve-hour period.

For this purpose, an a.m.-p.m. selector switch is employed and, as shown in FIG. 11, has a movable arm 115 positionable to engage either p.m. contacts 116 or a.m. contacts 117. In its centered position, the arm 115 leaves both the contacts 116 and 117 open. The switch wiper 115 is selectively movable to the a.m. or p.m. position by means of a knob 118 (FIG. 1) fast on a shaft 131 (FIG. 11) projecting through the front face of the programmer. When shifted either to engage the contact 116 or 117, the a.m.-p.m. switch arm 115 partially completes one of two parallel conduction paths 120, 121 which lead through a synchronizing switch 122 to the terminal T1 and the conductive ring 52. These two conduction paths 120 and 121 further include timing contacts 124 and 125 (only contacts 124 are visible in FIG. 2) which are controlled by the cam 84 which, as previously explained, is driven from the synchronous motor at a timed rate of one revolution each twenty-four hours. The cam 84 closes the contacts 124 during alternate twelve-hour periods which correspond to the p.m. hours, i.e., between twelve noon and twelve midnight. The cam 84 closes the contacts 125 during the other twelve-hour periods, i.e., those between twelve midnight and twelve noon. That is, the contacts 124 and 125 are respectively closed as the wiper 51 executes alternate ones of successive revolutions. Thus, if the conductive path 120 is partially completed by the switch 115, 116 being set to the p.m. position, then effective connection from the line L1 to the terminal T1 exists only during the p.m. hours, and the television set will be governed according to the program set up by the selector members $s1$–$s24$ only during the twelve-hour period between noon and midnight of each day. During the morning or a.m. hours the switch 124 will be opened by the cam 84 so that the motor 102 cannot be energized even though the wiper 51 continues its timed rotation and successively engages the associated contacts $c1$–$c24$. During the morning or a.m. hours, the contacts 125 will be closed by the cam 84, but this cannot result in energization of the motor 102 because the switch 115, 117 is at this time open.

If it should be desired to have the television receiver controlled during the a.m. hours, the user simply shifts the switch arm 115 to the a.m. position. With this, the connection from the voltage supply line L1 to the terminal T1 will be completed only during those times when the switch 125 is closed by the cam 84. This occurs during the a.m. hours, and accordingly, the television receiver will be turned on or off and set to receive the signals over the desired channels according to the program set up by the selector members, but during the a.m. hours. By this expedient of an a.m.-p.m. selector switch and the cam-controlled contacts 124, 125 which are closed during alternate twelve-hour periods, it is possible to make the relatively small and compact programmer which embraces only a basic twelve-hour time period control the television receiver over the entire twenty-four hours of a day. It is only necessary for the user to switch or position the a.m.-p.m. selector switch when he wishes to change from automatic programming in the p.m. hours to automatic programming in the a.m. hours, or vice versa. Of course, the selector members $s1$–$s24$ may be repositioned at this time in order to set up the particular program operation which may be desired in the a.m. or p.m. hours.

It is desirable that the operation of the programmer be terminated once each day so that the previously selected program will not be repeated unless some affirmative action is taken on the part of the user. Without provision against automatic daily repetition of a selected program, it might happen that the user in being absent from the premises over several days after having once selected a program, would inadvertently forget to turn off the television receiver and its programmer, so that the television receiver would continue its operation even though no one happened to be present.

To effect this automatic disabling of the television programmer once each twenty-four hours, the selector switch arm 115 is received within the notch of a cam 130 fixed on the shaft 131 (FIG. 11). As the cam is rocked counterclockwise or clockwise from the centered position illustrated, it will shift the switch arms 115 into engagement with the a.m. or p.m. contacts 116, 117. Whenever the cam is so rocked, the corners $130a$ or $130b$ thereof will axially displace a rod 132 having a latch 133 on the end thereof and biased to the right by a tension spring 134. Such displacement of the rod 132 will cause the latch to snap into engagement with the rim 135 of a gate wheel 136 rotated in unison with the cam 84 at a rate of one revolution per day. The rim 135 has a notch $135a$ therein which comes opposite the latch 133 at approximately twelve noon each day. Thus, whenever the cam 130 is rotated to a selected one of the a.m. or p.m. positions, contacts 116 or 117 will be closed to effect operation in the a.m. or p.m. hours of the day. However, at about noon each day, the gate $135a$ will fall opposite the latch 133 to release the rod 132 and permit the latter to be returned to the right under the influence of its biasing spring 134. A cross plate $132a$ on the rod 132 will thus strike the cam 130 and return the latter to its center position. This, in turn, restores the switch arm 115 to its center position so that neither the a.m. nor the p.m. contacts 116, 117 are closed. With this, the line L1 is isolated from the terminal T1 so that the motor 102 will not be energized regardless of the fact that the commutator wiper 51 continues to rotate and successively engage the associated contacts $c1$–$c24$. Further, a switch arm $115a$ is mechanically coupled to the arm 115 and adapted to close contacts $116a$ or $117a$ when in the a.m. or p.m. position. When the arms 115, $115a$ are centered in their "off" position, the circuit leading through the contacts $101a$ will be broken so that the television receiver 20 will be turned off until the knob 118 is returned to its a.m.

or p.m. position. The function of the contacts 115a, 116a, 117a is to make certain that the receiver 20 is turned off whenever the a.m.-p.m. switch 115 is reset to a neutral position. Suppose, for example, that at the instant the gate wheel 135 releases the latch arm 132 the shaft 24 is set in position for channel 5, and the switch 101a is closed to energize the receiver 20. When the latch arm 132 is released and the a.m.-p.m. switch 115 restored to its centered position, the motor 102 can no longer be energized. The shaft 24 will remain in its position and the contacts 101a will remain closed. However, centering of the switch arm 115 also centers the switch arm 115a, so that the television receiver will be turned off despite the fact that switch 101a is closed.

Because the commutator formed by the wiper 51 and the associated stationary contacts is not intended to be a precision device and to effect electrical connection to different ones of those contacts at precise time instants, it is desirable to provide some synchronizing control which will assure that the television receiver 20 is switched from one condition to another about 15 seconds before the end of each half-hour period. This assures that a complete half-hour program will be seen, and that the television receiver will be reset to a different channel, if desired, just prior to the beginning of the next half-hour program.

This is the function of the contacts 122 (FIG. 11) controlled by the cam 68 which, as previously described, is driven at a timed rate of four revolutions per hour. The cam 68 is shaped with one high portion thereon (FIG. 2) such that the contacts 122 will be closed for the 15 seconds just before the very end of each half-hour period represented by the positions of the hands of the clock 75. Because the cam 68 rotates at four revolutions per hour, the contacts 122 will also close 15 minutes after and 15 minutes before each hour. This, however, will have no effect on the motor 102 because the commutator wiper 51 at those instants will be between two of its associated contacts. Thus, it will be apparent that the switch 122 and wiper 51 isolate the terminal T1 from the line L1 except during 15 second intervals just before the end of each half-hour period. Therefore, even though the commutator wiper 51 has engaged an associated contact earlier, the motor 102 cannot be energized until the contacts 122 close, and thus the television tuner shaft 24 will be repositioned only during the last 15 seconds of each half-hour interval.

We claim as our invention:

1. In a programmer for controlling a television receiver having power input terminals and a tuner shaft movable to a first "off" position and to twelve other positions for reception of signals over twelve channels, the combination comprising a matrix having thirteen output conductors and twenty-four input conductors, means for selectively establishing electrical connection from each said input conductor to any one of said output conductors, a commutator having twenty-four spaced contacts connected respectively to said input conductors and a movable wiper engageable successively with such contacts, means for rotating said wiper at a timed rate of one revolution per twelve hours, a motor connected to drive the tuner shaft, means for establishing a circuit between said motor and said wiper; said circuit means including said matrix, means for connecting said thirteen output conductors to said motor and for disconnecting each one of the output conductors when the tuner shaft is in a corresponding one of its thirteen positions, switch means for selectively completing said circuit during a.m. or p.m. alternate twelve hour intervals, a latch member set to a latched position whenever said switch means is selectively conditioned, timing means for releasing said latch member once each day, means for causing said switch means to interrupt said circuit in response to release of said latch member, and means for completing an energizing circuit to the receiver power input terminals when the tuner shaft is in any of its positions except the said first position.

2. In a programmer for controlling a television receiver having power input terminals and a tuner shaft movable to a plurality of $m$ positions including an "off" position and $(n-1)$ channel positions, the combination comprising a matrix having $m$ output conductors and $n$ input conductors, selector means for establishing electrical connection from each said input conductor to any one of said output conductors, a commutator having $n$ spaced contacts connected respectively to said input conductors and a movable wiper engageable successively with said contacts, means for moving said wiper at a timed rate to engage said $n$ contacts during $n$ successive intervals with a program period, a motor connected to drive said tuner shaft, a circuit adapted for connection to a voltage source and including means connecting said motor to each of said $m$ output conductors except when said shaft is in a particular position corresponding to that output conductor, said circuit further including said wiper and said matrix, means for supplying power to said input terminals when said shaft is in any of its positions except said "off" position, and means for supplying power to said input terminals when said shaft is in its "off" position but is rotating.

3. The combination set forth in claim 2 further characterized in that said last two named means include a first switch in series circuit with said power means and a first cam on said shaft to open said switch only when the shaft is in its "off" position, second and third switches connected in series with one another and in parallel with said first switch, a second cam fixed on said shaft to close said third switch only when the shaft is in its "off" position, and a third cam rotatable within limits on said shaft and yieldably biased in one direction to close said third switch if the shaft is in its home position and if the shaft is rotating.

4. In a programmer for setting a movable control member to any one of a plurality of $m$ positions during $n$ succeeding time intervals according to a preselected program, the combination comprising first and second pluralities of $m$ and $n$ conductors disposed adjacent to one another and forming a grid-like matrix, a plurality of $n$ selector members movable to different positions along corresponding ones of said $n$ conductors, each of said selector members having means to effect electrical connection of its corresponding one of the $n$ conductors to any one of said $m$ conductors according to the position of that selector member, a plurality of $n$ equally and circularly spaced contacts connected to corresponding ones of said $n$ conductors, a conductive ring, a rotatable wiper adapted according to the angular position thereof to connect said ring to successive ones of said contacts, means for driving said wiper at a rate of one revolution per twelve hours so that it engages a different one of said contacts during the terminal portion of each $12/n$ hour interval, a first switch leading to said ring, timing means for closing said first switch for a short period at the end of each of said $n$ intervals, two parallel conduction paths leading to said first switch, second and third switches respectively connected in said two paths, timing means for alternately closing said switches during at least a portion of respective alternate twelve hour periods, two selector switches respectively connected in and settable to partially complete said two paths, and means for resetting either of said selector switches to an open condition once during each twenty-four hour period.

5. In a programmer for setting a movable control member to any of a plurality of $m$ positions during $n$ succeeding time intervals according to a preselected program, the combination comprising first and second pluralities of $m$ and $n$ conductors, a plurality of $n$ selector members each movable to different positions along a corresponding one of said $n$ conductors and having means to electrically connect its corresponding one of the $n$ conductors to any one of said *m* conductors, a rotatable member and means to continuously drive the same at a timed rate, means associated with said rotatable member for establishing electrical connection from such member to successive ones of said *n* conductors, two parallel conduction paths leading from an energizing source to said rotatable member, two selector switches for partially completing one or the other of said conduction paths, two timing switches connected in respective ones of said paths, means for alternately closing said two timing switches during at least a portion of the periods when said rotatable member is executing respective alternate revolutions, means responsive to closure of either of said selector switches for latching it closed, timing means for releasing said latch means to open the closed selector switch, and means responsive to energization of any one of said *m* conductors for moving the control member to a corresponding one of its *m* positions.

6. In a programmer having power means for setting a movable control member to any one of a plurality of positions during succeeding time intervals, the combination comprising *n* selector members settable to designate the desired position of the control member during *n* successive intervals of a twelve hour period, timing means for placing said *n* selector members in controlling relation to the power means during *n* successive intervals within successive twelve hour periods, means including an electrical circuit formed in part by the controlling selector means for energizing the power means to set the control member to the selected position, said electrical circuit including as a series portion thereof two conduction paths connected in parallel, manual switch means for partially completing one or the other of said conduction paths, first and second switches connected respectively in said two conduction paths, timing means for respectively closing said first and second switches during at least a portion of alternate twelve hour periods, and means responsive to closure of said manual switch means for holding the same closed, and timed means for releasing said holding means and opening said manual switch means.

7. In a programmer for an electrical device having a rotatable control shaft with alternately settable positions including an "off" position, the combination comprising, control means for selectively rotating said shaft, a control circuit for energizing said device including a first switch, means coupled to said shaft for opening said first switch when the shaft is in said "off" position, a normally open shunt circuit paralleling said first switch, said shunt circuit including switch means driven by said shaft for momentarily completing said shunt circuit when the shaft is rotated into said "off" position so that said device is not deenergized when said control means rotates said shaft through said "off" position but is deenergized when the shaft is rotated to the "off" position.

8. In a programmer having power means for setting a movable control member to any one of a plurality of positions during succeeding time intervals, the combination comprising *n* selector members settable to designate the desired position of the control member during *n* successive intervals of a twelve hour period, timing means for placing said *n* selector members in controlling relation to the power means during *n* successive intervals within successive twelve hour periods, means including an electrical circuit formed in part by the controlling selector means for energizing the power means to set the control member to the selected position, said electrical circuit including as a series portion thereof two conduction paths connected in parallel, manual switch means for partially completing one or the other of said conduction paths, first and second switches connected respectively in said two conduction paths, timing means for respectively closing said first and second switches during at least a portion of alternate twelve hour periods, and means for resetting said manual switch means once during each twenty-four hour period so that both said conduction paths are interrupted.

9. In a programmer having means for setting a movable control member to any of a plurality of positions during successive time intervals, the combination comprising an electrical circuit for energizing said setting means and including as a series portion thereof two conduction paths connected in parallel, one of said conduction paths including an a.m. selector switch and a timing switch having means to close the same only during the first twelve hour a.m. period of each twenty-four hour day, the other of said conduction paths including a p.m. selector switch and a timing switch having means to close the same only during the second twelve-hour p.m. period of each twenty-four hour day, and means for opening both of said selector switches once each day.

10. In a programmer having means for setting a movable control member to any of a plurality of positions during successive time intervals, the combination comprising an electrical circuit for energizing said setting means and including as a series portion thereof two conduction paths connected in parallel, one of said conduction paths including an a.m. selector switch and a timing switch having means to close the same only during the first twelve-hour a.m. period of each twenty-four hour day, the other of said conduction paths including a p.m. selector switch and a timing switch having means to close the same only during the second twelve-hour p.m. period of each twenty-four hour day, means for manually closing either of said selector switches, means for latching either of said selector switches closed, and timing means for releasing said latching means to assure that both said selector switches are opened.

11. In a programmer having means for setting a movable control member to any of a plurality of positions during successive time intervals, the combination comprising an electrical circuit for energizing said setting means and including as a series portion thereof two conduction paths connected in parallel, one of said conduction paths including an a.m. selector switch and a timing switch having means to close the same only during the first twelve-hour a.m. period of each twenty-four hour day, the other of said conduction paths including a p.m. selector switch and a timing switch having means to close the same only during the second twelve-hour p.m. period of each twenty-four hour day, means for manually setting either of said selector switches to a closed position, a spring-biased latch member, a gate wheel having a notch and means for driving the same at one revolution per day, means responsive to closure of either of said selector switches for shifting said latch member into engagement with said gate wheel, and means responsive to release of said latch member through said notch for assuring that both of said selector switches are opened.

12. In a programmer for an electrical device having power input terminals, motor means for moving a control member to any of a plurality of positions, and means for completing a power circuit to the power input terminals when the control member is in any but a predetermined "off" position, the combination comprising an electrical circuit for energizing said motor means and having as a series portion thereof two conduction paths connected in parallel, one of said conduction paths including an a.m. selector switch and a timing switch having means to close the same only during the first twelve-hour a.m. period of each twenty-four hour day, the other of said conduction paths including a p.m. selector switch and a timing switch having means to close the same only during the second twelve-hour p.m. period of each twenty-four hour day, means for manually setting either of said selector switches to a closed position to make said setting means effective during a.m. or p.m. portions of a day, means for resetting both said selector switches to an open position once each day, and means for assuring that said power circuit is interrupted as an incident to operation of said resetting means, even if such resetting operation occurs at a time when the control member is not in said predetermined "off" position.

13. In a programmer for an electrical device having power input terminals, motor means for moving a control member to any of a plurality of positions, and means for completing a power circuit to the power input terminals to turn the device "on" when the control member is in any of its positions except a predetermined "off" position, the combination comprising an electrical circuit for energizing said motor means and having as a series portion thereof two conduction paths connected in parallel, one of said conduction paths including an a.m. selector switch and a timing switch having means to close the same only during the first twelve-hour a.m. period of each twenty-four hour day, the other of said conduction paths including a p.m. selector switch and a timing switch having means to close the same only during the second twelve-hour p.m. period of each twenty-four hour day, means for manually setting either of said selector switches to a closed position to make said setting means effective during a.m. or p.m. portions of a day, a latch member, a gate wheel having a notch therein and means to rotate the same at one revolution per day, means biasing said latch in a first direction, means responsive to setting of either of said selector switches to a closed position for shifting said latch member in a second direction against the force of said biasing means and into engagement with said gate wheel, means responsive to release of said latch member through said notch to restore both of said selector switches to an open position, and means for assuring that said power circuit is interrupted whenever both said selector switches are opened.

14. In a programmer for an electrical device having power input terminals, motor means for moving a control member to a plurality of positions, means for completing a power circuit to the power input terminals to turn the device "on" when said control member is in any of its positions except a predetermined one, the combination comprising a plurality of conductors each corresponding to one position of the control member and connected in a circuit for selectively energizing the motor means, a first terminal, programmable timing means for connecting preselected ones of said conductors to said first terminal, two conduction paths connected in parallel and leading to said first terminal, one of said conduction paths including an a.m. selector switch and a timing switch having means to close the same only during the first twelve-hour a.m. period of each twenty-four hour day, the other of said conduction paths including a p.m. selector switch and a timing switch having means to close the same only during the second twelve-hour p.m. period of each twenty-four hour day, means for resetting both of said selector switches to an open condition once each day, and means responsive to operation of said resetting means for interrupting said power circuit until one of said selector switches is closed.

References Cited in the file of this patent
UNITED STATES PATENTS

| | | |
|---|---|---|
| 1,963,087 | Hay | June 19, 1934 |
| 1,975,781 | Flehr | Oct. 9, 1934 |
| 2,034,254 | Stenerson | Mar. 17, 1936 |
| 2,079,445 | Glass | May 4, 1937 |
| 2,863,996 | Hill | Dec. 9, 1958 |